United States Patent [19]

Keran et al.

[11] 4,304,597
[45] Dec. 8, 1981

[54] SYSTEM FOR CONTROL OF SINTER FORMATION IN IRON OXIDE REDUCING KILNS

[75] Inventors: Vitie P. Keran; Alan C. Baker, both of Harriman, Tenn.

[73] Assignee: The Direct Reduction Corporation, New York, N.Y.

[21] Appl. No.: 132,309

[22] Filed: Mar. 20, 1980

[51] Int. Cl.³ .............................................. C21B 13/08
[52] U.S. Cl. ........................................ 75/36; 266/173
[58] Field of Search ......................... 75/36, 33, 37, 38; 266/173

[56] References Cited

U.S. PATENT DOCUMENTS 3,831,913  8/1974  Ando et al. ............................. 75/36
3,890,138  6/1975  Hockin ................................... 75/36

Primary Examiner—M. J. Andrews
Attorney, Agent, or Firm—Cooper, Dunham, Clark, Griffin & Moran

[57] ABSTRACT

A method and means for improving control of the process for directly reducing ores containing iron oxide in a rotary kiln using a solid carbonaceous reducing agent, such as coal, introduced from the ore feed and discharge ends of the kiln, as both fuel and reductant, is disclosed wherein the temperature profile of the moving bed of solids is maintained such that the temperature is moderated to remain below the sintering temperature of the materials in the bed from the feed end zone for about the first two-thirds of the kiln length and the temperature is then maximized within sintering limitations in the working zone which is limited to about the last third of the kiln length. The temperature profile is controlled by regulating the volumes of air supplied to the kiln atmosphere from air injectors at spaced intervals along the length of the kiln, after establishing the appropriate proportion of coal steadily blown into the discharge end of the kiln for the particular process constituents being used.

12 Claims, 2 Drawing Figures

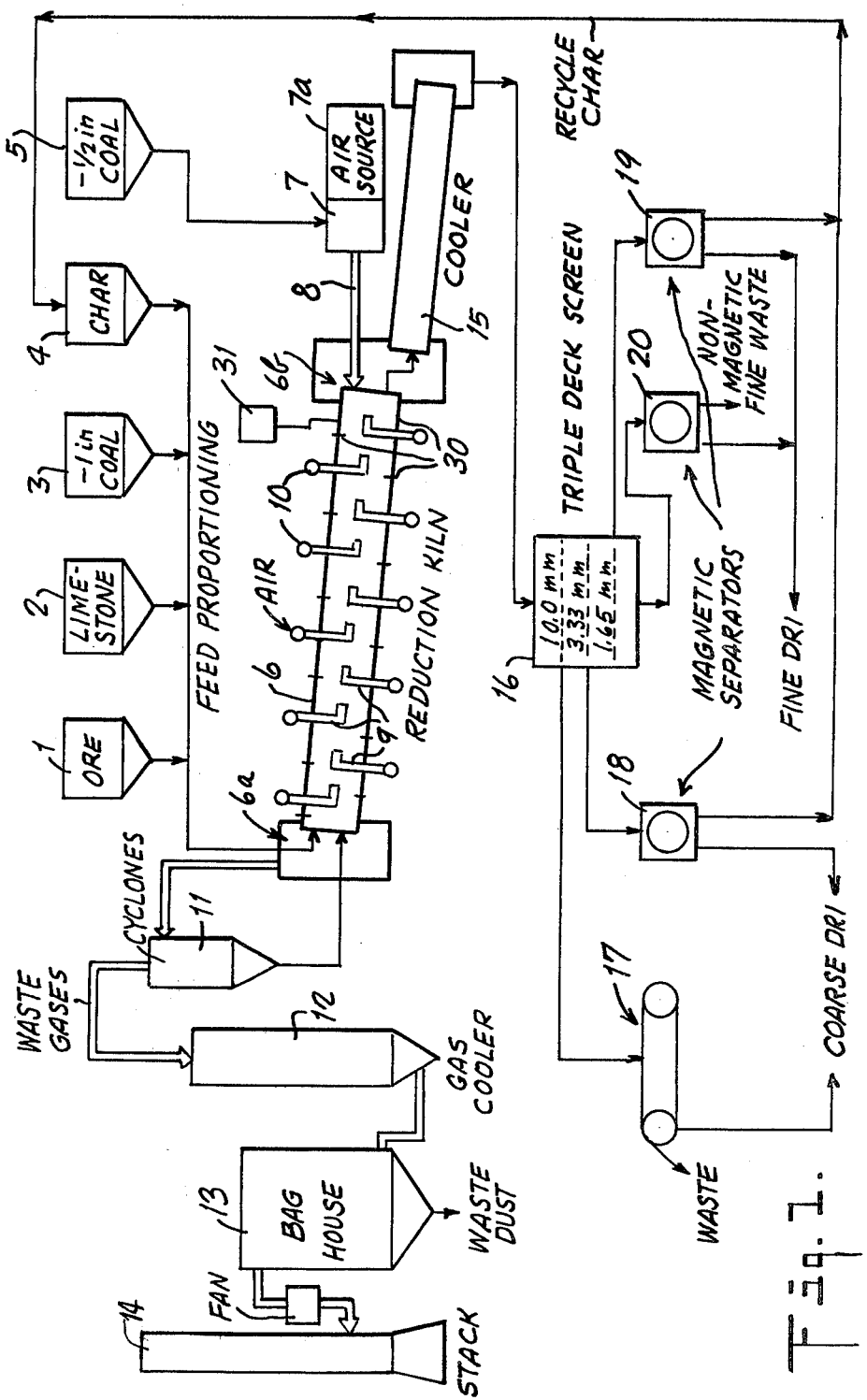

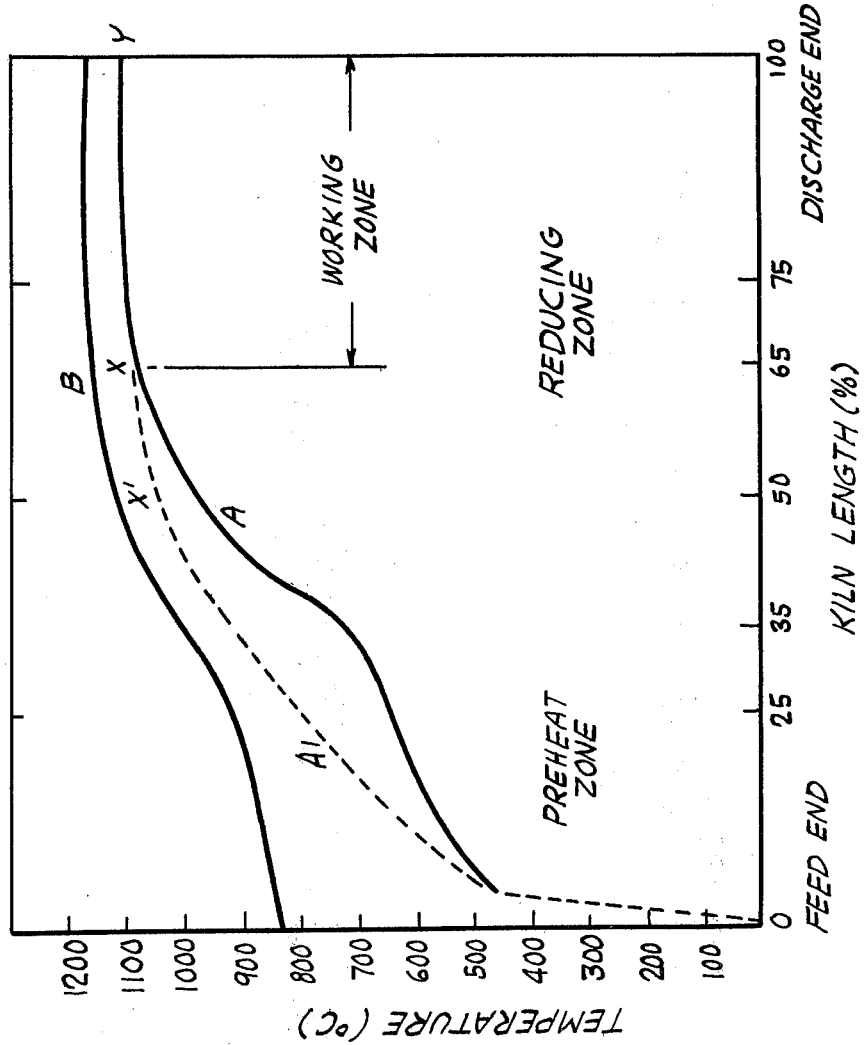

SYSTEM FOR CONTROL OF SINTER FORMATION IN IRON OXIDE REDUCING KILNS

BACKGROUND OF THE INVENTION

The present invention relates to a process for directly reducing iron ore in a rotary kiln using a solid, carbonaceous material, such as coal, as both fuel and reductant and, more particularly, to a method and means for maintaining a temperature profile within the kiln bed for eliminating sintering of the charge.

Many different methods have been suggested and used for carrying out the direct reduction of ores containing iron oxide using carbonaceous materials, particularly coal, as both the heating agent and reductant in a rotary kiln. For example, in some of these processes the coal is fed into the kiln through the discharge end by mechanical or pneumatic means, such as respectively disclosed in U.S. Pat. No. 3,113,859 to Moklebust and U.S. Pat. No. 3,505,060 to Heitmann, and in some it is fed at the center of or along the kiln, such as disclosed in U.S. Pat. No. 3,206,299 to Senior et al. However, considerable problems have been encountered with these various approaches, many of which problems have been overcome by the process disclosed in U.S. Pat. No. 3,890,138 to Hockin. In this latter process a portion of the coal is injected or blown from the discharge end of the kiln, and the remaining portion of the coal is fed with the ore at the charge feed end. The kiln is generally divided into a reducing zone toward the discharge end and a preheat zone toward the feed end, and the coal is distributed in the kiln in such a manner that the amount of coal injected from the discharge end is sufficient to aid in controlling the temperature profile throughout both zones of the kiln.

Although the process of Hockin was developed particularly for use in reducing ilmenite, it has been found that the dual end coal feeding technique improves upon the other coal feeding methods used in reducing iron ore to sponge iron in rotary kilns with the direct reduction process. The present invention relates to improvements in this latter process when dual end coal feeding is used but is readily applicable for use in kilns with other reductant feeding techniques as well.

SUMMARY OF THE INVENTION

The present invention involves an improvement to the process for the direct reduction of ores containing iron oxide in a rotary kiln using a solid carbonaceous reducing agent such as coal as both the fuel and reductant, which improvement is directed to eliminating fusion or sintering of the solid charge material or other deleterious effects in the kiln bed by properly regulating the temperature profile of the bed material.

More particularly, it has been found that rather than attempting to maximize the length of the zone within the kiln over which a high temperature is maintained in the bed of solids to produce reduction, the high temperature zone should be limited to about the last third of the kiln to avoid fusion or sintering in the bed. Appropriate temperature control may be achieved in kilns fitted with air injection devices along their length and wherein the reductant is fed from both ends by regulation of the air injected along the kiln length, after the proper proportion of coal injected at the discharge end is established. A temperature profile should be maintained within the bed of solids such that the temperature level is moderated below the sintering temperature of the solids through about the first two-thirds of the kiln length and is maximized consistent with non-sintering through about the last third.

BRIEF DESCRIPTION OF THE DRAWINGS

FIG. 1 is a diagrammatic view of a direct reduction plant utilizing a rotary kiln for the production of sponge iron in which kiln the present invention may be applied.

FIG. 2 is a plot of the temperature profiles of the solids and gas occurring along the kiln length and illustrating a solids temperature profile in keeping with the present invention.

DETAILED DESCRIPTION OF THE PREFERRED EMBODIMENT

A flow diagram of a direct reduction plant for the production of sponge iron, of the type utilizing a rotary kiln operated generally in the manner disclosed by Hockin in U.S. Pat. No. 3,890,138 is shown in FIG. 1. The plant comprises an array of feed bins respectively including: a bin 1 for supplying ore, typically in the form of iron oxide pellets or natural lump ore; a bin 2 for providing limestone or dolomite for sulfur control; a bin 3 for providing a suitable carbonaceous reducing agent, typically in the form of coal of less than 1 inch nominal diameter particles; and a bin 4 for supplying recycle char. The iron ore, coal, return or recycle char, and dolomite or limestone are accurately proportioned and fed continuously as a charge to the feed end 6a of the reduction kiln 6. A remaining bin 5 supplies coal, typically of less than $\frac{1}{2}$ inch nominal diameter particles to the discharge end 6b of the rotary kiln 6, where carefully controlled quantities are injected or blown in. The coal is fed to a fireman device 7 from which it is blown by means of low pressure carrier air from a suitable source 7a, through a coal injection pipe 8 which can be adjusted to achieve the optimum trajectory for this coal. A suitable system for the blowing and adjusting is disclosed in co-pending application Ser. No. 082,138.

The reduction kiln 6 may be typically 11.5 feet (3.5 meters) in outside shell diameter and 148 feet (45 meters) long, sloped at 3%. It may be supported on two tires and driven by a 200 horsepower variable speed D.C. motor and lined with 8 inches of refractory brick of preferably castable refractory.

In addition to the introduction of carrier air through pipe 8, the kiln is equipped with a series of shell mounted air injection tubes 9 which are spaced along its length and extend into the interior of the kiln for drawing air from the outside and injecting it along the kiln axis to enhance combustion. Each of the tubes 9 is equipped with its own fan and motor combination 10 so that the rate of injection may be properly regulated at spaced positions along the kiln. Also, fixed along the kiln are twelve spaced thermocouples 30 which measure the average temperature of the charge in the kiln and of the gas.

The hot waste or off-gases exhaust from the feed end 6a of the kiln and pass into an off-gas processing or cleaning system. In a suitable cleaning system the gases may be passed first to twin refractory-lined scalping cyclones 11, which remove and recycle coarse dust and then to a 57 feet high by 11.5 feet inside diameter spray cooling tower 12 where the may be cooled to 500° F. before passing to an 8-cell bag house 13 equipped with glass fiber bags for removing the fine dust. The cleaned gases may exit via an induced draft fan and a 100 feet high stack 14.

The material discharged from the discharge end 6b of reduction kiln 6 by means of a sealed transfer chute consists of a mixture of sponge iron, coal char, coal ash and desulfurizing agent. This material is cooled in a rotary cooler 15 which is sealed from the ambient atmosphere, fitted with lifters, and cooled externally with water. The cooled mixture is then passed from the cooler 15 to a screening system 16 and screened. The two oversized fractions are subject to magnetic separation in respective magnetic separators 17 and 18, and the remaining fines are magnetically separated in separators 19 and 20. Separators 17 and 18 remove the coarse sponge iron to the product load out area. The nonmagnetic fractions from the separators 17, 18 and 19 are conveyed to the return char bin 4. This separation system then yields coarse and fine sponge iron, recycling char and fine nonmagnetic waste.

In a plant such as shown and described in connection with FIG. 1, with proper control of combustion conditions over the kiln bed and reduction conditions in the bed, high rates of heat transfer and optimum utilization of kiln volume, with metallization consistently in a 90%–95% range, can be achieved.

Regarding the process itself, directly reducing iron oxides in the rotary kiln using solid carbonaceous material derived from coal as the source of heat and reductant involves complex gas/solid reaction mechanisms. Overall reduction kinetics are affected by bed temperature, solids particle size, carbon/iron oxide ratio in the bed, reactivity of the char produced from the coal, the effect of catalysts on char reactivity, and reducibility of the iron oxide. Control of the rate of heat transfer to the bed and control of bed temperature are critical parameters for steady operation of the kiln so that stable process chemistry and kinetics result.

For purposes of the description of the present invention the process may be understood in terms of the following simplified reactions:

$$Fe_2O_3 + CO \rightleftharpoons 2FeO + CO_2 \quad (1)$$

$$FeO + CO \rightleftharpoons Fe + CO_2 \quad (2)$$

$$CO_2 + C \rightleftharpoons 2CO \quad (3)$$

The equilibria and rates of these reactions (1), (2), (3) approach optimum levels with increase in the temperature of the bed of solids in the rotating kiln. For this reason, reduction kilns are optimally operated at as high a temperature as can possibly be achieved without causing deleterious effects such as fusion or sintering of the solid charge material. In particular to ensure stable kiln operation, sintering and fluxing of coal ash, iron oxide fines and calcium oxide must be controlled. This limits the maximum temperature of kiln operation.

Typical profiles of the solids temperature, Curves A and A', and gas temperature, Curve B, occurring in a kiln of the present type are shown in FIG. 2. The kiln is generally regarded as having a preheat zone at the feed end which normally extends through the first one-third of the kiln length and a reducing zone which extends for the remainder of the kiln length. The relative lengths of these two zones may vary depending upon the point where reducing actually begins, which point will vary with the bed components and kiln conditions. As seen in FIG. 2 the solids temperature profiles, Curves A and A', show that the solids temperature normally increases steadily from the feed end beyond the preheat zone of the kiln to a point X about 60% of the kiln length from the feed end. The solids temperature profile from point X to the discharge end of the kiln, point Y is then maintained relatively constant. The region from X to Y can be termed the 'working zone' of the kiln where optimum operating temperature levels are sought and reactions (1), (2), and (3) proceed to completion at the highest rate possible at the temperature of the solid materials in the bed. As indicated, the optimum operating temperature of the bed in this working zone is limited by the onset of sintering of the charge material, accretion formation on the kiln walls and other deleterious effects on overall performance and product quality. The permissible maximum temperature for a particular solids bed in the working zone depends on the properties of the specific coal or solid carbonaceous reductant that is used in the process because the temperature at which sintering occurs will vary will different coal ashes when mixed with the other solid phases in the bed of solids which include, for example, CaO and CaS from limestone, Fe, FeO, $Fe_3O_4$ and $Fe_2O_3$ from iron oxide feedstock, $SiO_2$, CaO, FeO, Fe, $Al_2O_3$, MgO, $K_2O$, and $Na_2O$ from coal ash. The magnitude of the maximum temperature of the solids in the working zone will normally be in the range from 900° C. to 1080° C. depending on the fluxing properties of the specific mixture of components.

This limitation of maximum temperature has consistently, in the past, suggested to those skilled in the art that kilns should be operated such that the working zone, X to Y, should be made to occupy the largest possible proportion of the kiln length. This preferred method of operation is indicated by Curve A' in FIG. 2 where the working zone X' to Y occupies 50% of the kiln length.

A 3.5 meter diameter by 45 meter long kiln such as shown in FIG. 1 was operated in this preferred manner, that is, with solids temperature profile A', and it was found that sinter formation occurred in the region of 35% to 65% of kiln length but not in the retion 65% to 100%. This was a particularly unexpected discovery because the solids temperature in the 35% to 65% zone as seen in FIG. 2, was more than 150° C. lower than in the 65% to 100% region.

Following from this discovery it was postulated that the sintering was occurring because solid phases were present in the 35% to 50% zone resulting from the fact that reactions such as equation (1) create a mixture of solid phases between CaS, CaO, FeO, $SiO_2$, $Fe_2O_3$, $Al_2O_3$ and MgO in the proportions necessary to form low melting point mixtures, thus causing sintering to occur. The solid particles involved were the fine fractions that undergo chemical reaction sooner than large particles and have greater contact surface area allowing fusion to occur. It was further postulated that if the fine particles were allowed more time in the kiln at a lower temperature, then chemical reactions would transform the surface of all particles to a condition such as existed in the 65% to 100% zone and consequently sinter formation would not occur.

The 3.5-meter by 45-meter kiln was then used to evaluate these postulations. Progressively bed solid temperatures were reduced in the feed zone of the kiln from profile A' to A, primarily by precise distribution of air supplies to the individual air injection tubes 9 once the proper proportion of coal blown into the discharge end of the kiln was established. It was observed that as temperatures were lowered the predominant area of the sintering formation moved correspondingly from the 35% zone towards the discharge end of the kiln. When a profile such as Curve A was established no sinter formation occurred.

Consequently, a method for controlling sinter formation in rotary kilns, of the type described, has been discovered whereby the length of the working zone of the kiln is limited in order to allow chemical transformations to occur in the charge before entering the working zone, so that low melting point phases do not cause sintering in the 35%-65% zone of the kiln. This improved process is achieved in accordance with the present invention by lowering or moderating the solids temperature in the 35%-65% zone of the kiln and then operating the kiln at the maximum possible temperature consistent with non-sintering in the 65%-100% zone.

FIG. 2 shows a maximum temperature of about 1080° C. for the solids in the working zone and a temperature essentially below 750° C. in the preheat zone for the process tested. These temperatures should not normally be exceeded in most cases but the particular temperature levels appropriate for a given process will, as already mentioned, depend upon the constituents of the solids in the bed and accordingly on the properties of the solid carbonaceous material or coal used. Thus, in operating a kiln in accordance with the present invention it may be necessary, as is customary in the art, to first empirically test various grades of coal in the process to work out the optimum temperature levels for each. However, once the appropriate level is determined for the particular materials being used in the process, the kiln may then be operated without sintering and other deleterious effects in the solids bed by moderating the bed temperature along about the first two-thirds of the kiln length and then maximizing the temperature consistent with non-sintering in about the remaining third.

It will be appreciated that accurate measurements of the kiln temperatures, to permit close control of the temperature profiles along the kiln, is essential for control of sinter formation in the kiln and continuous production of high quality directly reduced iron. Temperature measurements must be precise and reliable to enable proper operating controls to be applied. To accomplish such temperature measurements, firstly, the twelve permanent thermocouples 30 installed along the full kiln length are used. These thermocouples should be shielded to withstand the continuous exposure to heat and corrosion within the kiln and will give an average temperature at each location. One readout is generated by each thermocouple for each revolution of the kiln, which is normally operated at about 0.60 rpm, so that the readouts will provide an indication of the trends in the charge and gas temperatures over a period of several hours. In addition, a second thermocouple system 31 is preferably used for separately and directly measuring bed and gas temperatures at selected positions, such as at the sampling ports, along the kiln to permit immediate evaluation of the process conditions and accordingly prompt control.

It will also be understood that even, controlled release of heat along the kiln is required to avoid localized high temperatures or "hot-spots" and consequently sintering. Combustion of the volatiles from the coal fed at the discharge end supplements heat generated by the combustion of carbon monoxide escaping from the bed. Therefore, the low pressure air injection rate and the proportion of the discharge end coal should be carefully regulated to control overall kiln performance. A proper steady feed rate for this coal and its proportion will depend upon the actual coal used, but once the proper rate is established and maintained no further regulation is normally required.

In addition to regulating this coal feeding, the desired temperature profile is controlled by adjusting the volumes of air introduced into the kiln through the air injection tubes 9. Each tube 9 is fitted with its own shell fan 10 which may be adjusted so that the air input from the set of tubes can be selectively controlled along the length of the kiln to burn combustibles in the freeboard over the bed. In this fashion only the exact volume of air needed to fulfill the heat requirement is added at each location. These air tubes generally direct the air towards the kiln discharge end, counter current to the exhaust gas flow, enabling improved gas mixing. However, it has been found particularly advantageous to reverse the tubes near the feed end as more specifically described in co-pending application Ser. No. 051,017.

A further consideration in achieving proper control is the fact that differentials between bed and gas temperatures in the kiln can be markedly affected by the car content of the bed so that close control of feed rates and of feed proportioning to the kiln is important to maintain the proper char level in the bed. The proportion of discharge end coal may range up to 60% of the total coal depending upon the coal used. Careful monitoring and regulation of these and the other described operating parameters will permit kiln temperature profiles to be readily maintained within plus or minus 10° C. It will therefore be seen that the temperature profile established with the present invention has two main features, that is: firstly, a smooth rise in the bed and gas temperatures up to the required operating levels and secondly, a flat constant temperature region over the entire working zone of the bed, the latter zone being limited to about the last one-third of the kiln length. Again, the appropriate parameters for achieving control in this regard will depend upon the particular components or constituents used in the process and may be empirically determined by those skilled in the art when practicing the present invention in the light of the present disclosure. Although the invention was developed and has been described in connection with the direct reduction of ores containing iron oxides in rotary kilns using dual end feeding of coal, it will be appreciated by those skilled in the art that it will also find application in kilns using other forms of reductant and feeding.

What is claimed is:

1. In the process for reducing ore containing iron oxides using a solid carbonaceous reducing agent as the source of fuel and reductant in a rotary kiln fitted with air injection devices spaced along its length for injecting air axially therein, and wherein the reducing agent forms with the ore and other solid constituents added to the kiln a moving bed of solids therein, the improvement comprising maintaining the temperature profile of the bed of solids in the kiln such that the maximum possible temperature for non-sintering of the constituents occurs in the bed only in approximately the last third of the kiln and the temperature is moderated in the remainder of the bed to below said non-sintering temperature.

2. The process of claim 1 wherein part of the reducing agent is added from the ore feed end and part is added from the discharge end of the kiln and the temperature profile is established by regulating said reducing agent added from the discharge end in combination with the adjusting of the axial air injection along the length of the kiln.

3. The process of claim 2 wherein the temperature profile once established is maintained by adjusting the air input from said air injection devices selectively along the length of the kiln.

4. The process of claim 1 wherein the maximum temperature of the moving bed of solids in about the last third of the kiln is in the range from about 900° C. to about 1080° C.

5. The process of claim 4 wherein the temperature of the moving bed of solids in about the first third of the kiln is maintained below 750° C.

6. The process of claim 1 wherein the temperature of the moving bed of solids in the middle third of the kiln is in the range from about 750° C. to about 900° C.

7. A method for controlling sinter formation in a rotary kiln directly reducing ore containing iron oxides using at least one solid carbonaceous material as the source of fuel and reductant, which kiln is fitted along its length with combustion-supporting gas injection devices for injecting said gas axially therein and with temperature-sensing devices and has a preheat zone toward the charge feed end and a working zone toward the discharge end, comprising the steps of:

establishing feed rates and proportions for the ore and carbonaceous material to produce a relatively stable process in the kiln;

measuring the temperature of the bed and gases within the kiln along its length with the temperature-sensing devices; and adjusting the gas injection along the kiln length such that the temperature of the bed throughout the preheat zone of the kiln is maintained at a temperature moderately below the sintering temperature of the constituents of the bed, and the temperature of the bed in the working zone is maintained at the maximum possible level for non-sintering of the constituents therein, and the working zone is limited to about the last third of the kiln length.

8. The method of claim 7 wherein part of the carbonaceous material is added from the charge feed end and part is added from the discharge end of the kiln and the temperature profile is established by regulating said carbonaceous material added from the discharge end in combination with the adjusting of the gas injection.

9. The method of claim 7 wherein the temperature profile once established is maintained by adjusting the gas input from said gas injection devices selectively along the length of the kiln.

10. The method of claim 7 wherein the maximum temperature of the moving bed of solids in about the last third of the kiln is in the range from about 900° C. to about 1080° C.

11. The method of claim 7 wherein the temperature of the moving bed of solids in about the first third of the kiln is maintained below 750° C.

12. The method of claim 7 wherein the temperature of the moving bed of solids in the middle third of the kiln is in the range from about 750° C. to about 900° C.

* * * * *